Jan. 16, 1945.                S. M. LILLIS                2,367,411
                           OIL SEAL CONSTRUCTION
                            Filed Dec. 17, 1943

INVENTOR.
Stephen M. Lillis
BY
Parkinson & Lane Attys.

Patented Jan. 16, 1945

2,367,411

UNITED STATES PATENT OFFICE 2,367,411

OIL SEAL CONSTRUCTION

Stephen M. Lillis, Chicago, Ill., assignor to Victor Manufacturing & Gasket Co., Chicago, Ill., a corporation of Illinois Application December 17, 1943, Serial No. 514,634

4 Claims. (Cl. 288—3)

The present invention relates to an oil seal and more particularly to a novel oil or fluid seal assembly having an outer channel member formed of a laminated resin-impregnated fibrous sheet and an inner channel member of metal.

Among the objects of the present invention is to provide an oil or fluid seal formed of a pair of channel sections, an outer or bottom channel section composed of a phenolic-resin impregnated fiber board to which the sealing diaphragm is molded, and an inner or top channel section formed of steel or other suitable metal providing a reinforcement and preventing excessive deformation of the plastic outer or bottom channel section and permitting rough handling. This steel inner or top channel section is preferably cemented into the plastic outer or bottom channel section to thereby form a rigid assembly.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
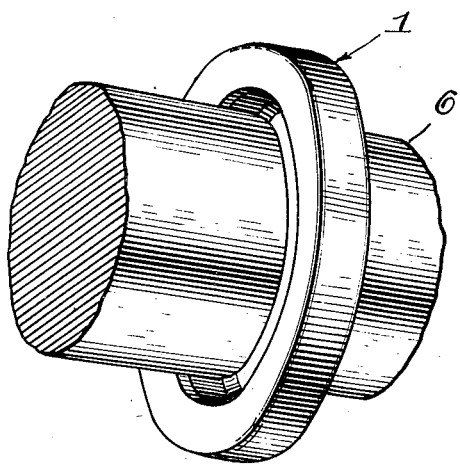
Figure 1 is a view in perspective of the novel oil seal which in the illustrative embodiment is shown as an internal type seal adapted to be mounted or press-fitted into a housing surrounding a rotatable shaft, and with the sealing diaphragm in continuous sealing contact with the shaft.

Referring more particularly to the disclosure in the drawing, the novel oil seal 1 is therein illustrated as of the internal type comprising an outer or bottom channel section 2 to the end wall 3 of which is molded a sealing diaphragm 4 having a sealing lip 5 pressed against and maintained in wiping and sealing contact with a rotatable shaft 6 by means of a coil or contractile spring 7, and an inner or top channel section 8. The outer or bottom channel section 2 with its sealing diaphragm 4 and the inner or top channel section 8 form a complete, unitary assembly adapted to be press-fitted into a housing surrounding the rotatable shaft 6, with the coil spring 7 maintaining the sealing lip in sealing contact with the shaft under all operating conditions.

Figure 3:
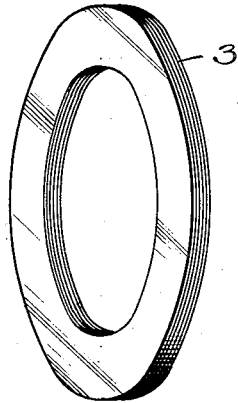
Figure 3 is a perspective view of an end wall of the outer or bottom channel section.
Figure 4:
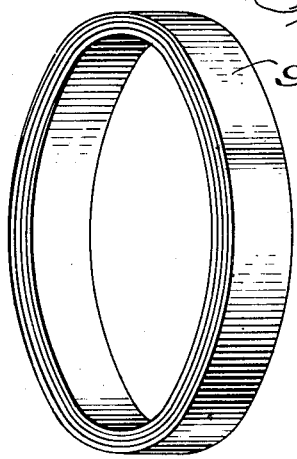
Figure 4 is a view in perspective of the cylindrical wall for the outer or bottom channel section.

The channel section 2 is formed of a laminated, resin-impregnated fiber board or paper stock as shown more clearly in Figures 3 and 4, the end wall 3 being preferably blanked from a sheet of molding stock of resin-impregnated fiber board formed of the desired number of laminations, and the cylindrical wall 9 may be severed from a tube which has been spirally wound upon a mandrel to the desired thickness of laminations or from a tube formed of a sheet of the desired laminations having its edges or ends in abutting relation. This end wall 3 and cylindrical wall 9 are then assembled in their intended position and placed in a preform die and therein preformed cold to form the assembled, angular channel section. After this preforming operation, the channel section is placed in a mold with a blank of compounded synthetic rubber stock for forming the sealing diaphragm 4, and this channel and the compounded synthetic rubber stock are then molded for a predetermined period and at a predetermined temperature. As an example of such a molding operation, excellent results have been secured by employing a phenolic-resin impregnated fiber board and molding this preformed channel section and sealing diaphragm stock for a period of approximately 30 minutes and at a temperature of approximately 312° F. The cure sets up both a phenolic-fiber channel section and the compounded synthetic rubber diaphragm in a single operation.

Figure 2:
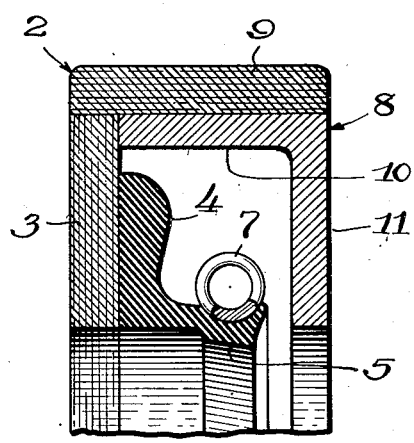
Figure 2 is an enlarged view in vertical cross section through the seal assembly.

After the outer or bottom channel section with its resilient diaphragm molded thereto is completely formed, the channel section 8 with its cylindrical wall 10 and its end wall 11 is cemented into the outer or bottom channel section in the manner shown in Figure 2, thereby forming a complete oil seal. By cementing or bonding the concentric cylindrical surfaces of the outer and inner channel sections, the rigidity of the outer or bottom channel section is greatly enhanced and the end wall 11 is so located as to prevent dislocation of the coil or contractile spring 7.

Furthermore, by making the inner or top channel section of steel or other metal suitable for the purpose, the plastic outer or bottom channel section is reinforced and prevented from deforming, and the seal assembly may be roughly handled.

Although the drawing discloses an illustrative embodiment in which the seal is shown as of the internal type, it will be readily appreciated that this novel construction is equally well adapted for use as an external type seal in which the retaining shell composed of the channel sections is press-fitted or secured upon and rotates with the shaft, and the sealing lip is maintained in sealing and wiping contact with the interior surface of the surrounding housing or enclosure.

Having thus disclosed by invention, I claim:

1. An oil seal assembly comprising a channel-shaped retaining shell composed of a pair of substantially L-shaped telescoping sections, one of which is formed of laminations of resin-impregnated fibre board having a cylindrical part providing a surface for association with one of a pair of members to be sealed and a radial wall portion, and a resilient sealing ring having a body portion bonded to the inner surface of the wall portion and a lip for sealing against the other member to be sealed, the other section of the shell being formed of metal and having a cylindrical part bonded to the cylindrical part and axially abutting the radial wall portion of the first mentioned section for reinforcing the latter section and permitting rough handling of the assembly.

2. An oil seal assembly comprising a channel-shaped retaining shell composed of an outer and an inner interengaging section each provided with a cylindrical part and a radially projecting flange with the cylindrical parts mounted in telescoping relation, the outer section formed of laminations of resin-impregnated fibre board and its cylindrical part providing a surface for association with one of a pair of members to be sealed, a resilient sealing ring having a body portion bonded to the radial flange of the outer section and a sealing lip for sealing against the other member to be sealed, the inner section being formed of metal and having its cylindrical part bonded to the cylindrical part and axially abutting the radial wall portion of the outer section for reinforcing the assembly.

3. An oil seal assembly comprising a retaining shell composed of a pair of substantially L-shaped telescoping sections, one of which is formed of laminations of resin-impregnated fibrous material molded to form an integral section having a cylindrical part providing a surface for association with one of a pair of members to be sealed and a radial wall portion, and a resilient sealing element having a part bonded to the wall portion and a sealing lip for sealing contact with the other member to be sealed, the other section of the shell being formed of metal and having a cylindrical part bonded to the cylindrical part of the first mentioned section for reinforcing the latter section.

4. An oil seal assembly comprising a retaining shell consisting of a pair of interengaging sections each provided with a cylindrical part and a radially projecting flange with the cylindrical parts mounted in telescoping relation to provide a channel-shaped assembly, one of which is formed of laminations of moldable fibre board united to form an integral section with the cylindrical part providing a surface for association with one of a pair of members to be sealed, and a resilient, moldable sealing element having a substantially radially extending part bonded to the flange of the laminated section and a sealing lip for sealing contact with the other member to be sealed, the other section of the shell being formed of metal and having a cylindrical part bonded to the cylindrical part of the first mentioned section for reinforcing the latter section and permitting rough handling of the assembly.

STEPHEN M. LILLIS.